United States Patent [19]

Regueiro

[11] 4,278,064
[45] Jul. 14, 1981

[54] FUEL CONTROL SYSTEM FOR A DUAL-FUELED POWER UNIT

[75] Inventor: Jose F. Regueiro, Rochester, Mich.

[73] Assignee: Deere & Company, Moline, Ill.

[21] Appl. No.: 18,241

[22] Filed: Mar. 7, 1979

[51] Int. Cl.³ .......................... F02B 3/12; F02M 13/00
[52] U.S. Cl. ..................................... 123/577; 123/575; 123/543; 123/526
[58] Field of Search ................... 123/27 R, 27 GE, 23, 123/123, 121, 127, 1 R

[56] References Cited

U.S. PATENT DOCUMENTS

| | | | |
|---|---|---|---|
| 2,400,219 | 5/1946 | Barnaby et al. | 123/27 GE |
| 2,400,247 | 5/1946 | Miller et al. | 123/27 GE |
| 2,502,990 | 4/1950 | Rathbun | 123/121 |
| 2,690,167 | 9/1954 | Moulton | 123/27 GE |
| 2,954,760 | 10/1960 | Hug | 123/27 GE |
| 3,203,407 | 8/1965 | Fleischer | 123/27 GE |
| 3,738,341 | 6/1973 | Loos | 123/127 |
| 4,077,367 | 3/1978 | Steiger | 123/23 |

OTHER PUBLICATIONS

"Food, Forest Wastes = Low BTU Fuel", ASAE Publication, Jan. 1978, pp. 30–32, 37, 38, by T. R. Goss.

Primary Examiner—P. S. Lall

[57] ABSTRACT

A turbo-charged, inter-cooled governed speed diesel engine directly coupled to an alternator for electrical generation is adapted for dual-fuel operation and mounted on a trailer which also supports the engine's fuel sources including diesel fuel in a conventional tank. The second fuel is producer gas generated in a down draft continuously operating producer of the moving-packed-bed vertical flow reactor type with co-current gas flow. Solid waste such as crop residues, e.g., corn cobs, is used as fuel stock for the producer and is conveyed automatically to the producer from a bin on the trailer. Before delivery to the air intake of the diesel engine the producer gas is conditioned by passing it through a cyclone and filter to remove solid particulate matter and a cooler-condenser for cooling the gas and condensing out tars. The diesel governor and fuel pump assembly is modified only by the application of a fuel rack stop for maintaining a pilot flow of diesel fuel and the engine control system is such that the response of the diesel injection system to changes in engine load is normal in general; however, automatic controls are provided for monitoring diesel pump fuel rack position and engine load so that after engine loading is increased a throttle valve in the gas supply to the engine is progressively and relatively slowly opened tending to increase engine speed so that the diesel injection rate is conventionally cut back correspondingly until an equilibrium condition is reached in which engine fuel demand in excess of the pilot minimum diesel fuel flow required to maintain combustion is provided by producer gas. The response of the system to a decrease of engine loading when the engine is operating at minimum diesel fuel flow (that is with the fuel rack stop effective) is to reduce fuel supply rapidly and appropriately by partially closing the gas throttle valve. Automatic safety shutdown provisions include, in at least one shutdown mode, delayed shutting off diesel fuel flow following producer gas shutoff so that the engine and exhaust system are purged of producer gas so as to reduce explosion hazards.

5 Claims, 11 Drawing Figures

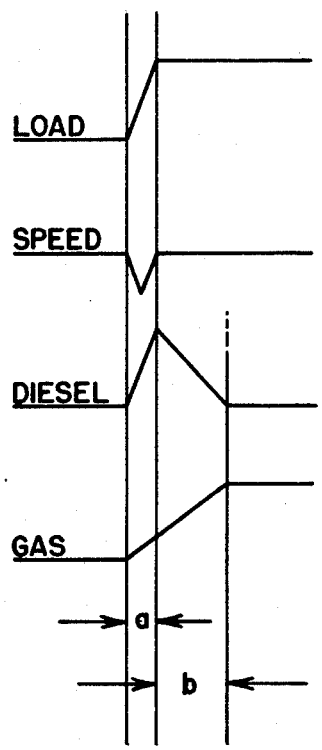
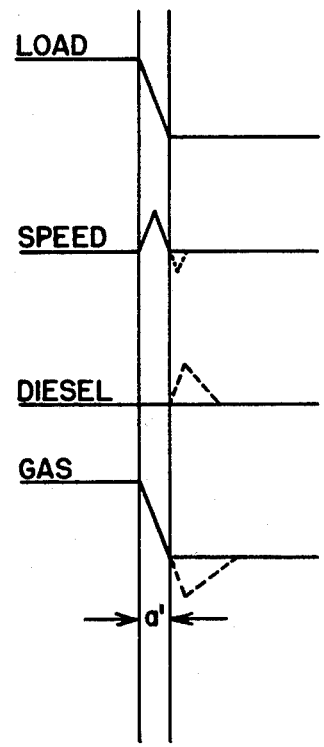
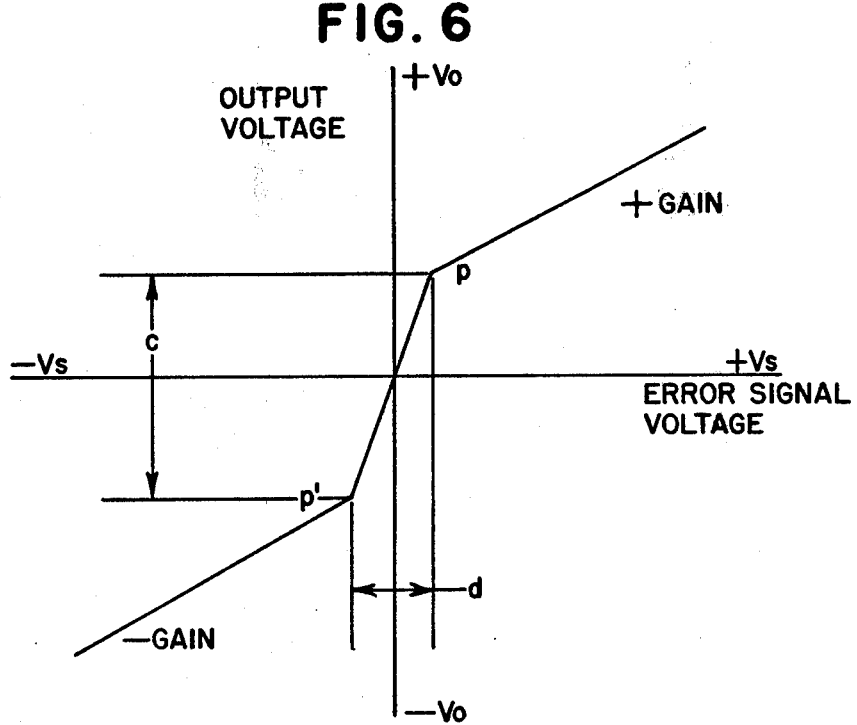

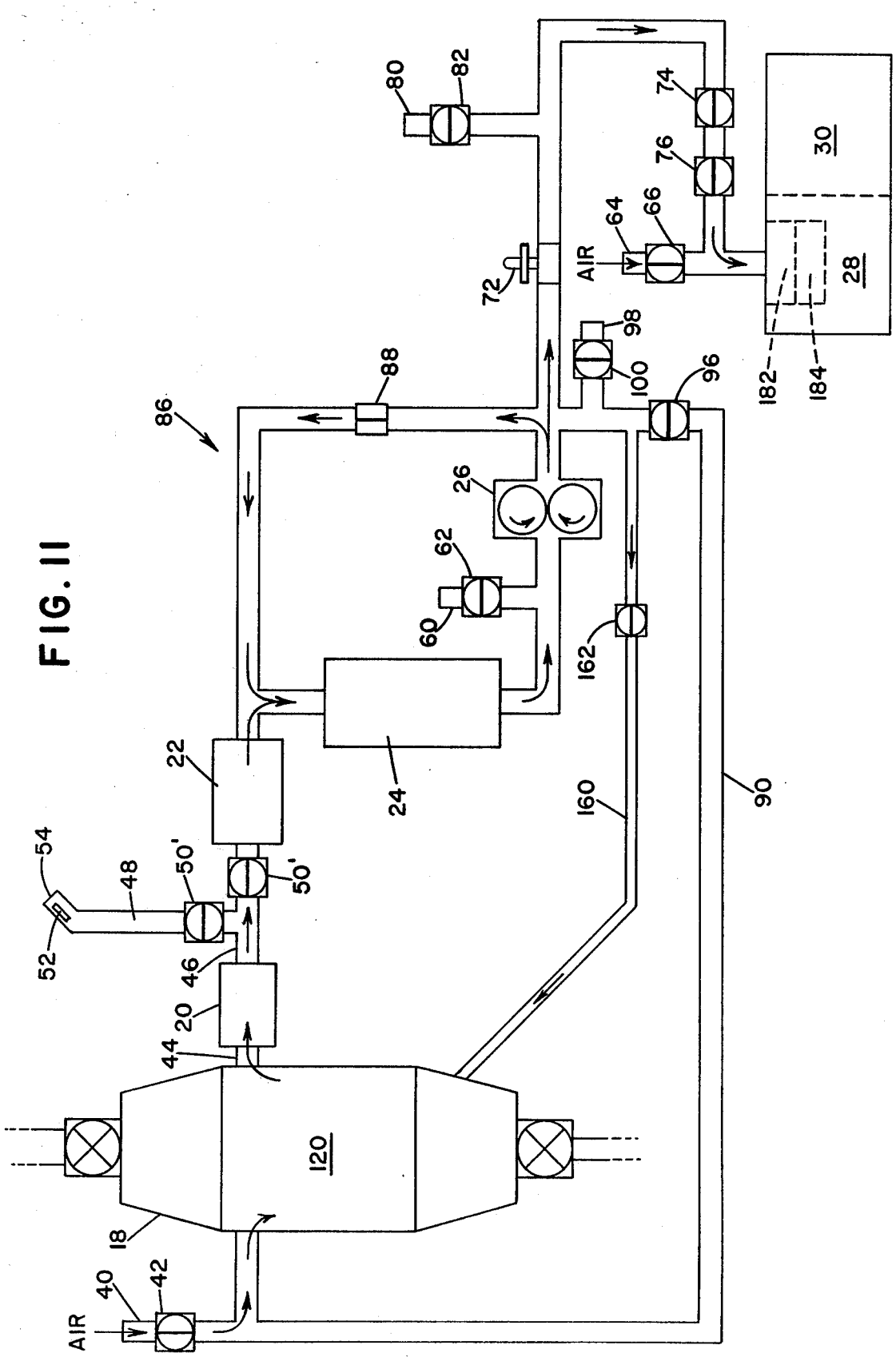
FIG. II

FUEL CONTROL SYSTEM FOR A DUAL-FUELED POWER UNIT

BACKGROUND OF THE INVENTION

The invention relates generally to self-contained power units particularly adapted to use in close association with a crop processing operation in which a crop residue may be used as a fuel and in particular to power units including an internal combustion engine simultaneously supplied with two or more fuels, the fuels differing substantially in physical properties and the fuel supply systems differing substantially in response to change of demand.

An unfavorable comparison of projected world energy needs with estimated availability, particularly of conventional non-renewable energy resources, has intensified interest in the development of alternative energy sources including fuels derived from wastes such as crop residues. Large amounts of energy are available in the form of crop, food processing and forest industry residues (biomass). However for successful utilization of this energy, particularly at the farm, processing plant or lumber mill, a simple low-cost method of recovering thermal and electrical energy from these residues is required. Downdraft gasification in a vertical flow packed-bed reactor is one such method and, because hot gases flow in the same direction as the fuel stock, has good potential to provide clean fuel for small engines but so far its adoption has been limited and embodied typically in batch-fired systems requiring considerable manual control and offering only limited running times. A practical system offering continuous automatically controlled operation and requiring a minimum of manual supervision and adaptable to providing a low BTU gas of a composition and condition suitable for conversion in an energy converter either as the sole fuel or as a fuel component in a more sophisticated multi-fuel system was still needed. Waste and residue conversion technologies, including pyrolysis systems utilizing vertical flow packed-bed reactors, are discussed in "Solid Wastes and Residues—Conversions by Advanced Thermal Processes", ed. Jones and Radding, ACS Sumposium Series, American Chemical Society 1978, through page 162.

Some studies of the utilization of producer gas from crop residues as a fuel in an internal combustion engine have been made with gas having a heat content of only 180 BTU's per cubic foot but it was projected that heating value could be increased to about 400 BTU's per cubic foot (at least from wood waste) if all condensible fractions were removed from the gas and if process air was reduced or eliminated from the gas. It has been suggested that producer gas, particularly that made from low quality and variable stock, is likely to be only marginally adequate for use as a sole fuel in an internal combustion engine even after a considerable refining and conditioning of the gas.

Known dual-fueled engines are typically supplied with piped gas under relatively high pressure, as well as diesel fuel, with a gas throttle valve responding directly to the engine governor's signals, If, however, gas for a dual-fueled engine comes directly from a local gas producer or gasifier, gas input response will be dependent upon the operating characteristics of the producer and its supporting equipment upstream of the engine. Slow response of this type of gas supply to a change in demand caused by a change in engine loading will result in large engine speed variations. If in a dual-fueled diesel engine the diesel injection quantity is fixed (say at a low pilot level) and the engine governor operates only the gas throttle valve, unacceptable variations of engine speed with engine load will generally result.

Another problem of known dual-fueled internal combustion engine control systems, where one of the fuels is a gas such as producer gas, is the hazard of explosion within the exhaust system if unburned producer gas is exhausted from the combustion chamber.

SUMMARY OF THE INVENTION

Accordingly, it is an object of the invention to provide a control system for a dual-fueled internal combustion engine which is capable of maintaining engine speed and performance during dual-fueled operation and which is tolerant of one of the fuels being a gas which may be furnished at relatively low pressure and whose quality may vary and the supply of which may respond relatively slowly to changes in demand caused by changes in engine loading.

Another object of the invention is to provide a control system for an engine supplied with both conventional fuel and producer gas in varying proportions according to conditions such as engine loading but where for economy it is preferable to use the highest feasible ratio of producer gas to conventional fuel. Another object of the invention is to provide an automatic fuel controlled system for a dual-fueled engine which minimizes speed fluctuations due to change of loading on the engine.

A further object is to provide a control system for a dual-fueled engine, using as one fuel a low grade gas, offering a first automatic shutdown mode responsive to any one of a plurality of signals indicative of the departure of the engine operating conditions from desired criteria such that gas is purged from the intake and exhaust system of the engine prior to shutdown, and a second shutdown mode, responsive to more extreme departures from desirable engine operating criteria, in which all fuel and air supplies to the engine are shut off very rapidly.

It is a feature of the engine to provide a dual-fueling control system which may be applied to a conventional internal combustion engine with a minimum of modification of the engine. In one form of the invention, an engine is modified only to maintain at least a predetermined minimum flow of a first fuel while ancillary equipment to adapt the engine for use of a second fuel includes a control valve with actuator and a control system with logic circuit. In this system, the response to an increase of engine load is conventional, but for steady running at the new load level, the flow rate of the first fuel is automatically cut back while that of the second fuel is increased.

Another feature of the invention is that in generating a control signal to adjust the rate of flow of one fuel in a dual-fueled engine, the control system takes account of both the flow rate of the other fuel and a parameter indicative of engine output, such as the electrical load, (if the engine is being used to drive an alternator).

BRIEF DESCRIPTION OF THE DRAWINGS

FIG. 3 is a schematic view of the self-contained power unit particularly showing the sequential arrangement of components in the system for generating producer gas and piping it to the engine.

FIG. 6 shows graphically the relationship between error signal voltage (input) and output voltage of a portion of the gas throttle valve control circuit.

FIG. 7 indicates in simplified diagrammatic form changes which may occur in engine speed, diesel fuel and gas flow rates when engine loading is increased.

FIG. 8 is similar to FIG. 7 but for a decrease in engine loading.

FIG. 11 is similar to FIG. 10 but with the diesel engine running and the gasifier supplying producer gas to the engine.

DESCRIPTION OF THE PREFERRED EMBODIMENT

Figure 1:
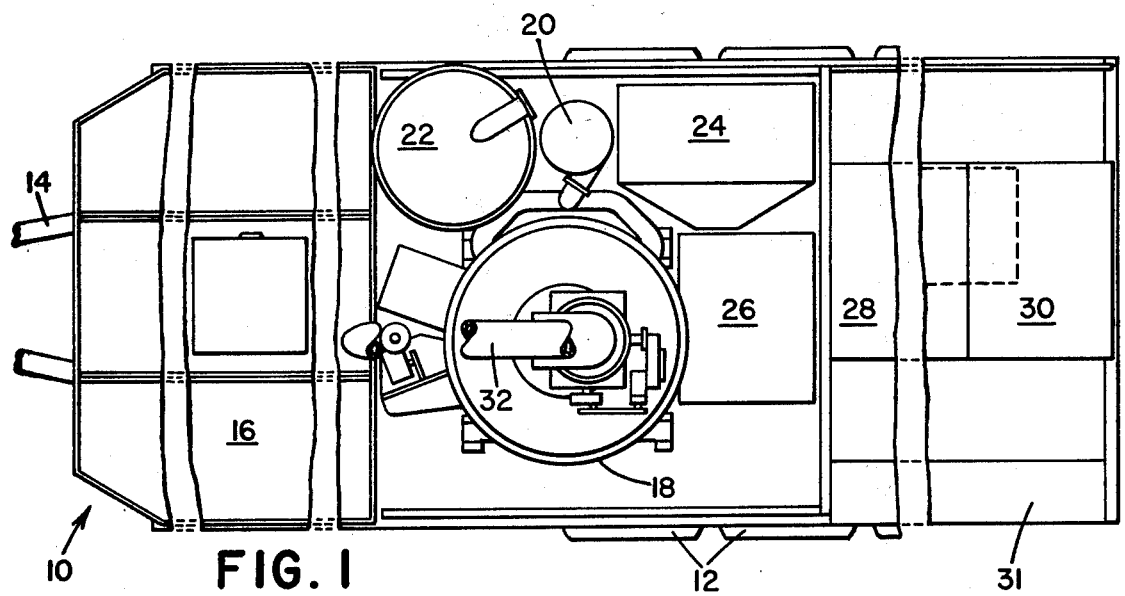
FIG. 1 is an overhead semi-schematic view of a self-contained portable electrical power generating unit embodying the invention.
Figure 3:
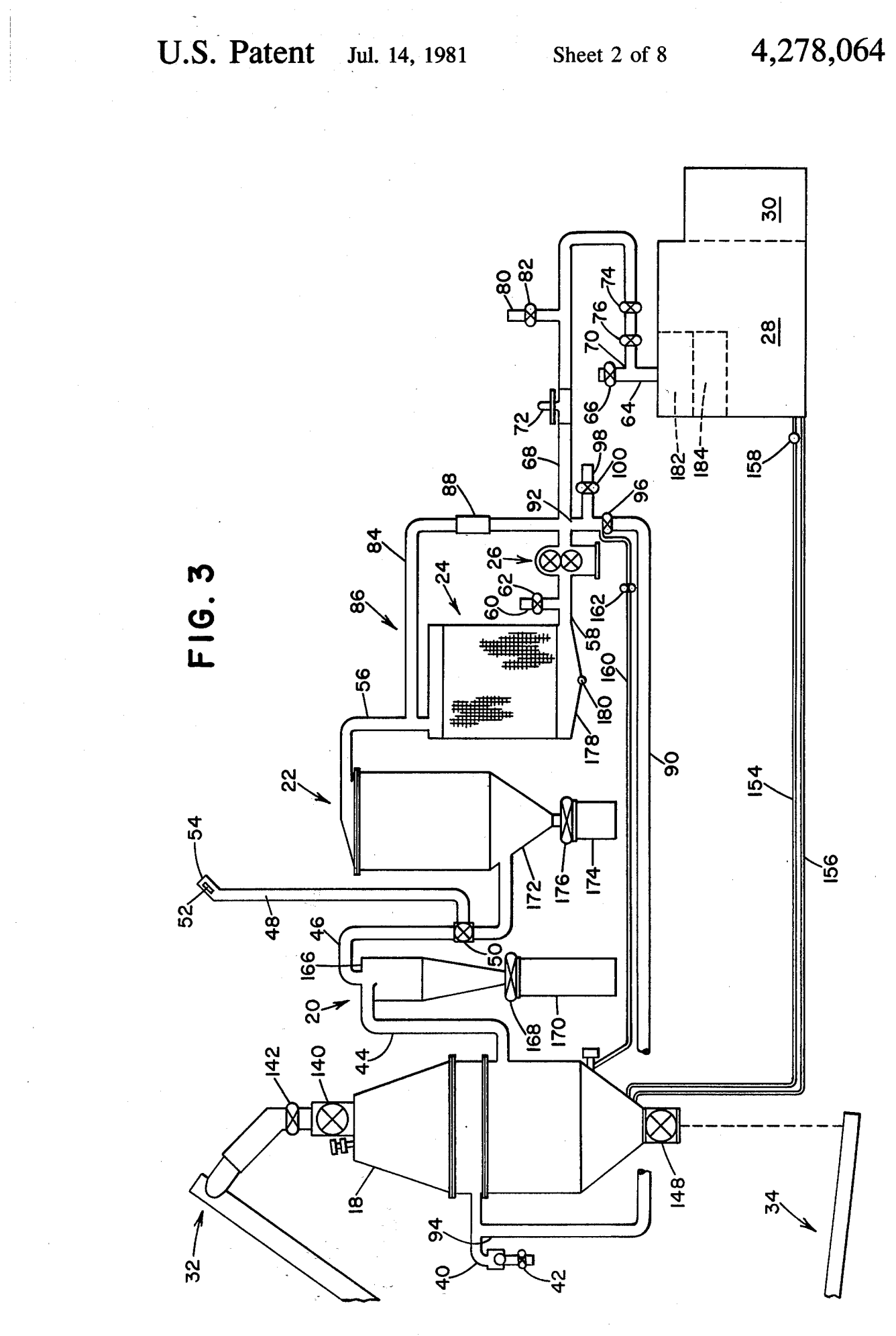

The invention is embodied in a self-contained portable electrical power generating unit the general configuration of which is indicated in FIG. 1 and which is shown schematically in more detail in FIG. 3. The entire unit is supported on a trailer 10 which is equipped with wheels 12 and a hitch 14 to provide mobility.

Principal components of the system include a solid fuel bin 16, a gasifier or reactor 18, a cyclone separator 20, a filter 22, a cooler-condenser 24, a gas blower 26, a diesel engine 28 fueled in part by diesel fuel from a conventional tank (not shown), an electrical generator or alternator 30 directly coupled to the diesel engine 28 and a control box and console assembly 31. Solid fuel is transferred from the fuel bin 16 to the gasifier 18 by a solid fuel conveyor system 32 and an ash conveyor 34 (shown one in FIG. 3) removes ash from the bottom of the gasifier 18.

A portable power unit similar to the present embodiment is described in "Development of Pilot Plant Gasification Systems for the Conversion of Crop and Wood Residues to Thermal and Electrical Energy", williams et al, "Solid Wastes and Residues—Conversion by Advanced Thermal Processes", ed. Jones and Radding, ACS Symposium Series, American Chemical Society 1978, page 142. The same paper discusses in more detail than the present application the processes and products of gasification.

As best seen in FIG. 3, the components of the system are connected by a series of pipes or conduits and a plurality of valves is provided for controlling flow of fluids in the system. The pipes or conduits and valves are conventional except as described below and include a gasifier air inlet pipe 40 equipped with a shut-off valve 42, a gasifier outlet or off-gas pipe 44 and a precleaned gas pipe 46. A raw gas flare pipe 48 is teed into the precleaned gas pipe 46, a three-way valve 50 being provided at the junction and conventional flare ignition controls 52 at the outlet 54 of the raw gas flare pipe 48.

A filtered gas pipe 56 extends between the filter 22 and the cooler-condenser 24 and a cool gas pipe 58 between the cooler-condenser 24 and the blower 26. A combustion starting air inlet pipe 60 provided with a shut-off valve 62 is teed into the cooled air pipe 58. The air intake stack 64 of the diesel engine 28 is equipped with a shut-off valve such as an electrically-operated butterfly valve 66. A gas delivery pipe 68 is connected between the blower 26 and a teed junction 70 in the engine air intake stack 64 and includes in-line components in sequence downstream of the blower 26 including an adjustable pressure regulator 72, a "snap-off shut-off valve 74 with manual opening and automatic closing in response to an electrical signal and a gas throttle butterfly valve 76 controlled by a throttle valve motor 78 shown only in FIG. 5. A clean gas flare pipe 80 is teed into the clean gas delivery pipe 68 downstream of the pressure regulator 72 and is equipped with a shut-off valve 82. The provision of a gas recirculating pipe 84, teed into the gas delivery pipe 68 downstream of the blower 26 and the filtered air pipe 56 upstream of the cooler-condenser 24, completes a blower recirculation loop 86 which includes the cooler-condenser 24 and an in-line non-return pressure relief valve 88 in the blower recirculation pipe 84.

A starting air delivery pipe 90 is connected between tee junctions 92 and 94, located respectively in the clean gas delivery pipe 68 downstream of the blower 26 and in the gasifier air inlet pipe 40 between the air inlet valve 42 and the gasifier 18 and includes a shut-off valve 96. A starting air bleed or muffler pipe 98 is teed into the starting air delivery pipe 90 between the teed junction 92 and the shut-off valve 96 and includes an adjustable valve 100.

Figure 2:
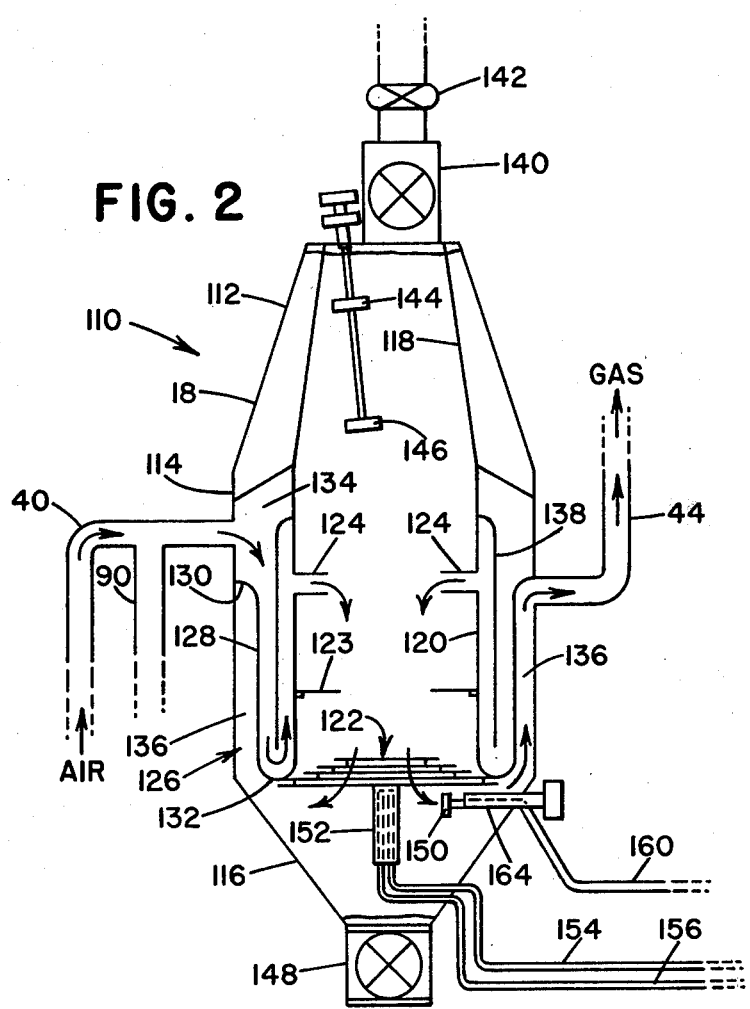
FIG. 2 is a simplified, diagrammatic vertical cross section of the gasifier showing its general configuration and the directions of flow of air entering and gas leaving the gasifier.

The gasifier 18, shown diagrammatically in some detail in FIG. 2, may be described as a downdraft producer or a moving packed-bed vertical flow reactor with co-current gas flow. It includes an outer shell or casing 110 comprising an upper frusto-conical portion 112, a main generally cylindrical portion 114 and a frusto-conical bottom portion 116. Concentrically mounted within the outer shell 110 is an inner shell or linear assembly consisting of an upper, downwardly diverging frusto-conical portion 118, serving as a fuel hopper and a main cylindrical or firebox portion 120. A motor driven rotating grate of the eccentric multi-plate type 122 forms a floor for the firebox 120. An annular choke plate 123 is supported by the wall of the firebox 120 above the grate 122. A plurality of tuyeres 124, circumferentially spaced, penetrate the wall of the firebox 120 near its top. Surrounding the firebox 120 is a baffle assembly 126 having a cylindrical wall 128 concentric with the firebox and an upper horizontal wall or flange 130 extending outwards to meet the gasifier outer shell cylindrical portion 114 and a bottom horizontal flange 132 extending inwards to meet the bottom edge of the wall of the firebox 120. The baffle assembly 126 thus creates an air plenum 134 communicating with the tuyeres 124 and the air inlet pipe 40, and an off-gas plenum 136 communicating with the underside of the grate 122 and the off-gas pipe 44. Suitable baffle or conduit means indicated only at 138 in FIG. 2 are provided to divert air incoming from the air inlet pipe 40 downwards to approximately the level of the grate 122 before it passes upwards along the outer wall of the firebox 120 to enter the tuyeres 124. The air inlet and off-gas pipes 40 and 44 have been shown diagrammatically with single connections to the gasifier but for better flow control and distribution circumferentially the connections may be manifolded.

The inlet to the fuel hopper 118 is sealed and admission of fuel to the hopper is controlled by conventional valves including a rotary air lock valve 140, complemented by a gate valve 142. Conventional fuel level sensors, such as motor driven impellers 144 upper and 146 lower, are disposed within the fuel hopper. The outlet from the gasifier shell bottom portion or ash hopper 116 is sealed and out-flow of ash is controlled by a conventional rotary valve 148, and ash level in the hopper 116 is sensed by a conventional sensor 150. A heat exchanger 152 for cooling a bearing portion of the grate 122 is connected to the cooling system (not shown) of the diesel engine 28 by supply and return piper 154 and 156 respectively and coolant is circulated by a pump 158 (FIG. 3). Provision for cooling the ash level sensor 150 is made by tapping the starting air pipe 90 upstream of the starting air valve 96 and providing a pipe 160 controlled by a valve 162 to conduct cool gas to a heat exchanger 164 associated with the ash level sensor 150.

The cyclone separator 20 is conventional, raw gas entering the separator near its top 166 from off-gas pipe 44 and leaving through the precleaned gas pipe 46 from the center of the cyclone top 166. A conventional valve 168 at the base of the cyclone 20 communicates with a particulate matter collector 170 below the cyclone. The filter 22 may be of the conventional bag house type employing fiberglass bags possibly in a cluster configuration. Particulate matter filtered out collects in a bottom hopper portion 172 and may be dumped into a collector 174 by opening the conventional valve 176 which normally seals the bottom of the filter.

The cooler-condenser 124 is generally conventional and includes a finned-tube heat exchanger and fan for air movement (not shown) and a bottom collecting tank 178 provided with a valve 180 for occasional dumping of the contents of the collecting tank.

The engine 28 may be of any suitable internal combustion type but a turbo-charged inter-cooled direct injection diesel is particularly adaptable to dual-fueling with the gas producer of the present invention. The ability of a turbo-charger and inter-cooler to improve the volumetric efficiency of an engine by compressing and cooling combustion air immediately before it enters the engine intake manifold are well known. In the present embodiment, it is a mixture of air and producer gas that is compressed with similar beneficial effect, complementing the preconditioning of the producer gas effected by the cleaning and cooling components upstream. A turbo-charger 182 and inter-cooler 184 are indicated schematically only in FIGS. 3, 10 and 11. The alternator 30 is conventional.

Figure 9:
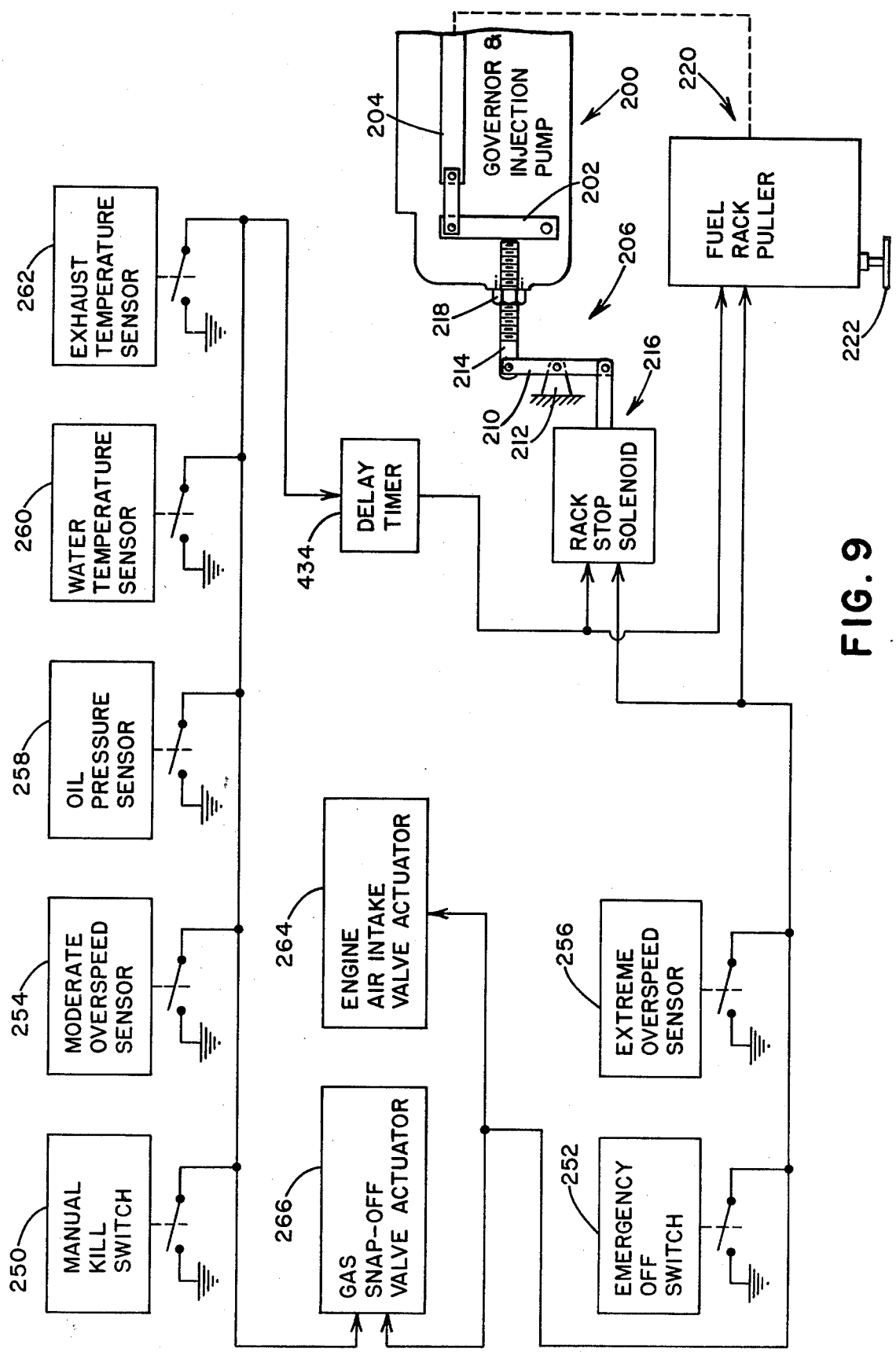
FIG. 9 is a simplified, schematic representation of the engine safety control circuit.

Turning now to engine controls, the engine 28 is equipped with a governor and injection pump assembly 200 such as a conventional centrifugal governor and in-line injection pump shown schematically only in FIG. 9 the governor including a fulcrum lever 202 providing the governor output and connected to a fuel rack (control element) 204 for adjusting fuel injection rate responsive to change in engine loading and hence engine speed in the usual way. The governor and fuel assembly 200 is modified or unconventional only in the provision of a solenoid operated fuel rack stop indicated generally by the numeral 206 (FIG. 9) and a potentiometer 208 (shown in FIG. 4 only) for measuring or sensing fuel rack position. The fuel rack stop 206 includes a lever 210 pivotally attached to a frame member 212 fixed to the engine 28 and pivotally connected at one end to a fuel rack stop arm 214 and at the other end to a solenoid operated actuator 216. Means such as the screw thread and stop nut 218, indicated in FIG. 9, are provided for changing the effective length of the stop arm 214 and so changing the position at which travel of the fuel rack 204 is stopped.

The engine is also equipped with a conventional fuel rack puller 220 (FIG. 9) having a handle 222 for manual reset of the puller and connected to the fuel rack 204.

Figure 4:
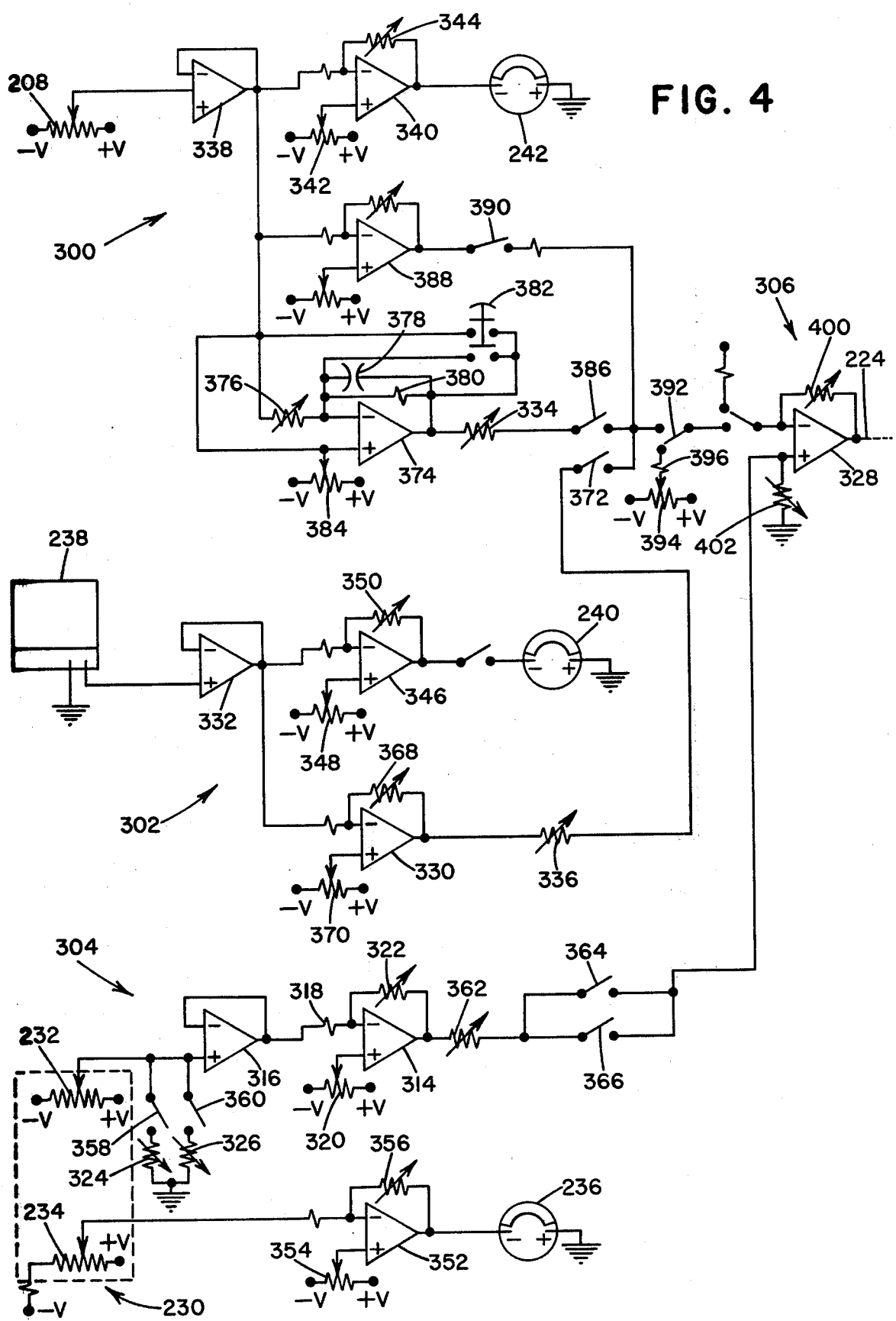
FIGS. 4 and 5, together, show schematically the electrical control circuit for the gas throttle valve.
Figure 5:
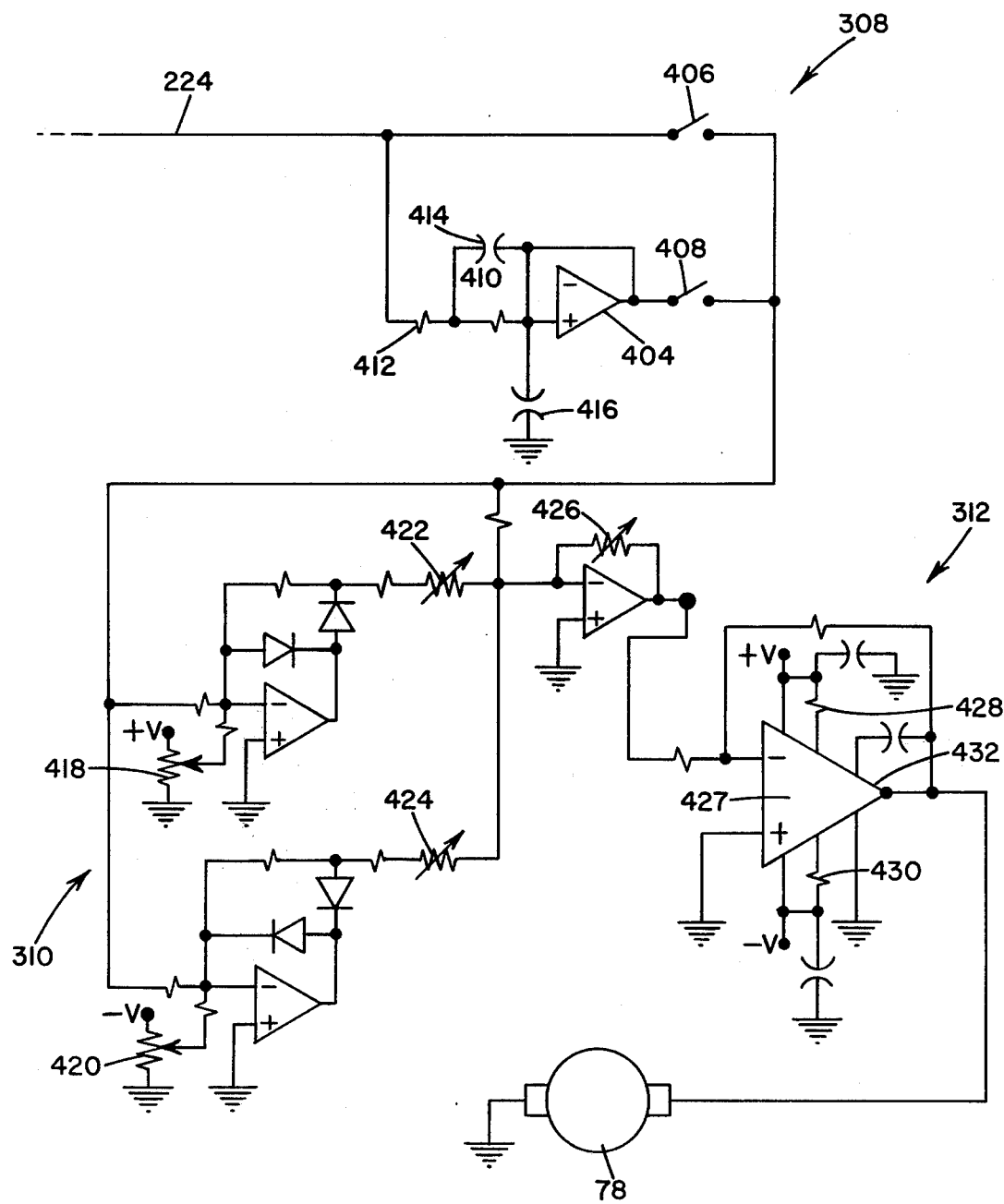

FIGS. 4 and 5 combined are a schematic represenation of a fuel control circuit for the dual-fueled engine 28. The circuit diagram is separated into two parts for convenience at an electrical conductor 224. Many components and some parts of the circuitry are conventional and are not described in detail here.

Using components indicated schematically only in FIG. 4, the position of the fuel rack 204, the degree of opening of the gas throttle valve 76 and the electrical load on the alternator 30 are sensed or measured. Opening of the throttle valve 76 is monitored with a dual rotary motion potentiometer 230 connected to the valve, one portion of the potentiometer 232 serving as a valve position feedback and the other, 234, used as a signal source for a meter 236 showing throttle valve position. Alternator load is monitored with a load follower unit 238 (such as Barber Colman Dyne II 80,000) which produces a signal proportional to the electric load on the alternator and indicated on load meter 240.

The position of the fuel rack 204 is sensed with a wire wound linear motion potentiometer 208 connected to the fulcrum lever 202 of the governor (which is in turn connected to the fuel rack 204 as indicated in FIG. 9). Fuel rack position is indicated on meter 242. The valve motor 78 connected to and driving the gas throttle valve 76 at the engine makes possible automatic control of the gas valve 76.

The engine 28 is also equipped with conventional controls and components related to engine operating and shut down safety, indicated in FIG. 9, and including a manual kill switch 250, an emergency off switch 252, engine speed sensors or tachometers 254 and 256 for sensing moderate and extreme overspeed conditions respectively, an oil pressure sensor 258 and water and exhaust temperature sensors 260 and 262 respectively. Additional safety controls include conventional electrically operated actuators 264 and 266 for closing the engine air intake valve 66 and the snap-off gas valve 74 respectively. The mounting and arrangement of electrical and electronic control components is in general conventional and not discussed in detail here. For convenience, many control switches, meters and the like are grouped suitably at the control box and console assembly 31.

In operation, with the diesel engine 28 under load, it is desirable that speed fluctuation of the engine due to changes of load should be kept to a minimum. This is particularly true when the engine 28 is driving a load such as the alternator 30, when for well known reasons it is desirable to keep the frequency of the output from the alternator nearly constant. It is also desirable for reasons of economy and/or conservation of a particular fuel that when an engine is dual-fueled as described here a control system be provided so that one fuel is favored over the other without adverse effect on speed control under varying load. In the present application therefore, the purpose of the engine fuel control system is to react to changes in engine loading and hence, tendency to change of engine speed, with a speed of response of at least no slower than that of the conventional speed governed diesel fuel injection system which response is generally acceptable in applications such as electrical power generation.

In applications such as that of the present embodiment where one fuel is diesel and the other is producer gas of relatively low heat value (BTU's per cubic foot), is not self-igniting in a compression ignition engine and is supplied at relatively low pressure and at a feed rate which is relatively slow to respond to changes in demand, a dual-fueled control system preferably includes the following features:

(a) Maintenance at all times of sufficient diesel fuel flow to maintain combustion of the producer gas and smooth running. Also, avoidance of interruption of diesel fuel flow and the possibility of reignition under dangerous manifold conditions. A suitable diesel fuel rate may approximate that for idling the engine at normal operating speed—typically 1800 rpm.

(b) Response as a conventional diesel engine to increase in engine loading by initially responding with a sufficient increase in diesel fuel feed to maintain engine speed and, at the same time, initiate a deliberate adjustment of the producer gas flow so that the producer gas flow progressively increases tending momentarily to increase engine speed while the governor and diesel fuel injection system respond conventionally to such speed increasing tendency and progressively cut back on diesel fuel feed until a predetermined minimum diesel rate is reached and the ratio of producer gas to diesel is stabilized at a maximum desirable level.

(c) Response on rapid decrease of engine loading, particularly when the diesel feed rate is already at the desirable minimum, by rapid coarse adjustment downwards of producer gas flow so as to avoid engine overspeed and passage of unburned gas into the engine exhaust system.

In such a dual-fuel control system, the governor and diesel injection pump assembly 200 operate normally and conventionally except that the fuel rack stop 206 may be actuated to set a lower limit to the quantity of diesel fuel being injected. An electrical control circuit is concerned with sensing parameters representative of diesel fuel flow and engine load (when a load follower 238 is provided) and controlling the gas throttle valve 76 accordingly. A suitable gas throttle valve control circuit is shown schematically in two parts in FIGS. 4 and 5.

Controlling gas flow with reference to engine load as well as diesel fuel rack position, helps provide more stable operation and adjustment to a new engine load level with less hunting. The use of the load follower 238 is, in a sense, a refinement and facilitates providing a selective response in which the gas throttle valve 76 opens relatively slowly in response to an engine load increase and relatively quickly on engine load decrease, as described below.

The responses in fuel flow and engine speed of the fuel control system to a change in engine loading are illustrated in FIGS. 7 and 8. These are simplified schematics representing only approximately the relationships and directions of change. No attempt is made to show the true form of typical actual responses. Relatively rapid load increase (FIG. 7) causes a momentary depression of engine speed and governor action to reposition the fuel rack 204 to increase diesel flow rate over a time interval a; gas throttle valve 76 opens over a longer time interval b while the diesel is progressively reduced under normal governor action. It is assumed that the available gas flow, in combination with the predetermined minimum diesel flow, provides sufficient energy for the increased load so that the fuel rack 204 returns to a position set by the fuel rack stop 206.

In FIG. 8, illustrating a rapid load decrease, it is again assumed that operation is at minimum "stopped" diesel flow so that the fuel rack stop 206 inhibits the normal response of the conventional governor and injection pump assembly 200 and diesel flow remains unchanged. The gas throttle valve 76 is, however, closed in a time interval such as a', much more rapidly than it is opened (as can be seen by comparison with FIG. 7). As an example of the sort of interaction that may occur in the system, it may be mentioned that operating conditions may be such that the response to engine load decrease (FIG. 8) is a coarse adjustment of the gas throttle valve 76 reducing gas flow sufficiently that engine speed is momentarily reduced and diesel flow is temporarily increased to maintain speed, as indicated by the broken lines in FIG. 8.

The control circuit (FIGS. 4 and 5) is made up of several circuit portions including signal conditioning circuits, indicated by the numerals 300, 302 and 304 (FIG. 4), for conditioning the signals from the fuel rack potentiometer 208, the load follower 238 and the gas throttle valve position potentiometer 232 respectively. Other circuit portions include a summing amplifier circuit 306 (FIG. 4), and a filter circuit 308, a nonlinear response circuit 310 and a power amplifier circuit 312 (FIG. 5).

After conditioning, the signals from the fuel rack potentiometer 208, the load follower 238 and throttle valve potentiometer 232 (feedback signal) are sent to the summing amplifier circuit 306 where the fuel rack and load signals are combined and compared to the throttle valve feedback signal and an error signal generated for driving the throttle valve motor 78.

The control system uses the signal from the load follower 238 to coarsely adjust the opening of the throttle valve 76 and the signal from the fuel rack potentiometer 208 to fine tune the opening of the gas throttle valve 76. Engine operating stability is improved by making the fuel adjustment in two stages, coarse and fine, rather than a single stage adjustment to minimize a "hunting" type of speed variation.

In the conditioning circuit 304, conditioning the signal from the feedback potentiometer 232 of the gas throttle valve 76, a nonlinear relation between the input from the potentiometer 232 and the output of an amplifier 314 is obtained using amplifiers 314 and 316, a resistor 318 and potentiometers 320, 322, 324 and 326. This nonlinear feedback signal is then sent to amplifier 328 in the summing amplifier subcircuit 306 where it is used to construct the error signal which drives the valve motor 78. The reason for generating a nonlinear feedback signal is to match the nonlinear relation between gas flow rate through the throttle valve 76 versus valve opening as indicated by the position of a valve element such as the butterfly of the present valve 76. When this is done, the feedback signal received by the amplifier 328 will be related approximately linearly, not to the valve opening or element position, but to the gas flow rate through the valve 76.

In the load follower conditioning circuit 302, the signal from the load follower 238 is conditioned by amplifiers 330 and 332. The signal from amplifier 332 is proportional to the input signal from the load follower 238 minus an offset voltage signal. Thus, a sharp change in load will result in a sharp change in amplifier 332 output causing rapid movement of the gas throttle valve to a new setting. During the time that the gas throttle 76 is adjusting for the change in load, the fuel rack 204 of the governor and diesel fuel injection assembly 200 will operate normally and shift to maintain constant engine rpm. As the gas throttle valve 76 approaches its new position, the diesel fuel rack 204 will approach a setting corresponding to a desired minimum diesel fuel rate as determined by the setting of the fuel rack stop 206.

The signal from the diesel rack potentiometer 208 is used to "fine tune" the opening of the gas throttle valve 76 by integrating the error between its actual instantaneous position and its desired position as determined by the setting of the diesel fuel rack stop 206. Integrating this position error signal allows small position errors to be corrected over a relatively long time span. Large error signals of short duration can be expected during changes in load but their effect on the integrator output will not be large. The time constant of the integrator can be adjusted to vary the effect that large error signals of short duration have on the integrator. The total range of valve element position adjustment that may be effected by the integrator signal varies according to the ratio of potentiometers 334 and 336 in the fuel rack potentiometer and load follower conditioning circuits 300 and 302 respectively. In a typical butterfly valve, such as the valve 76, providing for the integrator to change valve position by a total of 7 to 10 degrees is generally appropriate but the range must not be so great as to result in engine overspeeding in particular operating conditions. The integrated error signal is added to the load signal at amplifier 328 in the summing amplifier circuit 306.

The diesel rack position meter 242 taps into the output of an amplifier 338 of the fuel rack potentiometer signal conditioning circuit 300 for its input signal, which is in turn conditioned by an amplifier 340. Potentiometers 342 and 344 control the amplifier 340 offset and gain respectively and are used to adjust the meter 242. An additional high resolution meter for indicating small changes in the position of the fuel rack 204 may be desirable in some applications but is not shown in the drawings.

In the circuit of the load meter 240, an amplifier 346 conditions the load follower signal coming from an amplifier 332 and potentiometers 348 and 350 control the offset and gain respectively to adjust the meter.

In the circuit of the gas throttle valve meter 236, an amplifier 352 conditions the signal from the valve position meter potentiometer 324 and potentiometers 354 and 356 control the offset and gain respectively for adjusting the meter.

Connecting the output signal from valve position feedback potentiometer 232 in series with potentiometers 324 and/or 326 and then to ground allows a nonlinear response to be generated. Switches 358 and 360 allow the desired amount of resistance to be placed in series with the feedback potentiometer 232. Amplifier 316 is a voltage follower and amplifier 314 conditions the nonlinear input signal with potentiometers 320 and 322 controlling the offset and gain respectively.

Potentiometer 362 controls the gain for the valve feedback signal at amplifier 328. Switch 364 can be closed resulting in switch 366 being unable to break the feedback signal if so desired.

In the load follower conditioning circuit 302, amplifier 332 is a voltage follower and amplifier 330 conditions the signal with potentiometers 368 and 370 controlling the gain and offset respectively. Adjustment of potentiometer 370 indirectly determines a certain minimum level of diesel fuel injection rate in the sense that opening of the gas throttle valve 76 may be delayed until the voltage received from the load follower 238 exceeds the offset voltage coming from the potentiometer 370. Potentiometer 336 is used to control the strength of the signal reaching amplifier 328. In some conditions, it may be desirable to prevent the signal from the load follower 238 from reaching amplifier 328 and switch 372 is provided for this purpose.

In the conditioning circuit 300 of the fuel rack potentiometer 208, amplifier 338 is a voltage follower and amplifier 374 and the components connected to it make up an integrator the time constant of which is controlled by potentiometer 376 and capacitor 378. A high value resistor 380 allows a small bypass of current around the capacitor 378. Switch 382 is used to reset the integrator and potentiometer 384 to control the integrator offset. Potentiometer 384 is used to set the integrators so that its output doesn't change when the diesel fuel rack 204 is in its desired position. Potentiometer 334 is used in conjunction with potentiometer 336 in the signal conditioning circuit 302 of the load follower 238 to control the relative strengths of the signals coming from the integrator and the load follower. Switch 386 is provided for isolating the integrator signal from the amplifier 328.

Amplifier 388 produces an output signal proportional to the deviation of the diesel fuel rack 204 from its desired position. Switch 390 is provided for isolating this signal from amplifier 328. The use of this amplifier will be discussed further under the topic of control without the alternator 30.

Manual override of the automatic control of the gas throttle motor 78 is provided for by switch 392 for isolating the load follower and integrator signals from amplifier 328 and replacing them with a signal from potentiometer 394 which is then used for manual control of the gas throttle valve motor 78 and hence of the valve 76. The sensitivity of the potentiometer 394 may be adjusted by changing the value of resistor 396.

Simple, manual closing of the gas throttle valve 76 is effected by switch 398 isolating the amplifier 328 from the load follower and integrator signals and substituting a signal sufficient to cause total closure of the gas throttle valve.

In the summing amplifier circuit 306, amplifier 328 takes the load follower and integrator signals which have been added together prior to switch 392, compares the combined signal to the nonlinear feedback signal from gas throttle feedback potentiometer conditioning circuit 304 and generates an error signal which is used to drive the throttle valve motor 78. Potentiometers 400 and 402 control the gain and offset of this amplifier.

In the filter circuit 308, following the summing amplifier circuit 306, an active filter amplifier 404 is located such that the error signal from amplifier 328 can be filtered if desired using switches 406 and 408 as appropriate to include or exclude the filter resistors 410 and 412 and capacitors 414 and 416 control the response of the active filter, amplifier 404.

The nonlinear circuit 310 is provided to compensate for the dead-band portion of the output of the valve motor 78. The motor can operate in a total range between certain values of positive and negative DC voltage potential but a dead-band (c) or period of no output motion is experienced in a central portion of this range as indicated in FIG. 6 which shows the relationship between error signal voltage Vs (input) and output voltage Vo in the circuit 310. When the error signal coming from the summing amplifier circuit 306 is near zero, the gain of the circuit is very large but outside of the dead-band the gain changes to a lower value. Provision is made to adjust positive and negative gains independently and so selectively adjust the speed of opening and closing of the gas throttle valve 76 as effected by motor 78, both absolutely and in terms of relative speed of opening and closing.

The effect of this "nonlinear response" circuit 310 is to minimize the effect of the dead-band of the valve motor 78 so that the motor is nonresponsive for only a narrow central band of error signal voltage (d in FIG. 6). Potentiometers 418 and 420 control the plus and minus breakpoints (p and p') of the response curve shown in FIG. 6 while potentiometers 422 and 424 control the plus and minus gains respectively. Potentiometer 426 controls the overall gain (effectively controlling the gain in the dead-band area).

The error signal after being conditioned in the nonlinear response circuit 310 enters the power amplifier circuit 312 the output of which drives the valve motor 78. A power amplifier of the type exemplified by National Semiconductor LH0021C with a plus or minus 12-volt DC swing and an output of 1 amp has been found to be satisfactory. Resistors 428 and 430 are used as power limiters to protect the amplifier. The case 432 of the amplifier 427 is the output and is therefore electrically "hot".

A conventional power supply circuit (not shown) delivers a suitable voltage potential such as plus or minus 15-volts DC (regulated) to the gas throttle valve control circuit.

A gas throttle valve control circuit, such as that shown in FIGS. 4 and 5, may be used to control the gas throttle valve 76 in the absence of a signal from the load follower 238, for example, when the engine 28 is being used to drive something other than an alternator, such as an irrigation pump. In this case, the load follower portion of the circuit including the load follower signal conditioner circuit 302 would be isolated using switch 372.

The stability of the system during dual-fuel operation when relying only on the input signal from the fuel rack potentiometer 208 will suffer somewhat but acceptable performance will generally be obtainable. The signal from the fuel rack potentiometer 208 can either be conditioned through the integrator or through the proportional amplifier 388. In the latter case, switch 390 must be closed and switch 386 opened. Selection between use of the integrator circuit and the proportional amplifier 388 should be made according to which gives the better system performance. Operation without a load follower in the circuit may be with controls set so that diesel is stabilized at a flow rate greater than that corresponding to the fuel rack 204 engaging the stop 206 so that a fuel rack potentiometer 208 signal is available both on load increase and load decrease.

The nonlinear response circuit 310 may be adjusted to improve system stability when operating without a load follower 238. For example, an increase of negative gain and decrease of positive gain will result in relatively rapid closing and slower opening of the gas valve 76 thus lowering the tendency of the system to hunt.

Assuming maintenance of adequate supply pressure to the gas throttle valve 76, the nonlinear response of the feedback circuit should match the nonlinear relationship of valve opening to gas throughput as closely as possible. Such a match may be obtained by experimentally determining the characteristics of the throttle valve 76 and, in the nonlinear feedback circuit (in circuit 304), adjusting the resistance values of potentiometers 324 and 326 changing the gain of amplifier 314 using potentiometer 322 and changing the offset of amplifier 314 using potentiometer 320 and also by rotating the dual feedback potentiometers 232 and 234.

The dual-fueled engine controls also include an engine safety circuit shown in simplified schematic form in FIG. 9. Its purpose is to shut down the diesel engine in an appropriate manner on receipt of any one of a number of warning signals and also to provide for manual shut down. The engine may be shut down by manual actuation of the kill switch 250 or the emergency off switch 252 or automatically by signals originating from the sensors or transducers mentioned above and including moderate or extreme overspeeding of the engine (sensors 254 and 256 respectively), oil pressure below a certain minimum (sensor 258) or water or exhaust temperatures above a certain maximum (sensors 260 and 262 respectively). The circuit is powered, preferably by the battery (not shown and typically 12 v DC) of the diesel engine 28. Conventional indicator lights which remain on to show cause of shut down may be provided.

The supplying of a second fuel to the engine (the producer gas) while relying on the combustion of the first fuel for "pilot ignition" gives rise to the possibility of shutting down the engine in such a way that gas may accumulate in the exhaust system and result in a possibly damaging explosion. Two provisions help to reduce this possibility:

(a) the fuel stop 206 which can be actuated to limit the movement of the fuel rack 204 so that diesel fuel injection rate into the engine always exceeds a certain minimum sufficient to maintain ignition and the avoidance of misfiring and the passage of unburned producer gas into the exhaust system. A switch is provided (not shown) so that the fuel rack stop 206 may be inactivated if it is desired to run the engine on diesel fuel alone;

(b) delay circuitry 434 to cause a suitable delay (such as 1½ to 2 seconds) by any suitable electronic means whenever the engine is being shut down (except in response to an extreme overspeed condition or the operation of the emergency off switch) between the tripping of the actuator 266 for closing the snap-off gas valve 74 and retraction of the fuel rack stop 206 and tripping of the fuel rack puller 220 to move the fuel rack 204 so as to shut off all diesel fuel and stop the engine.

This delayed shutdown sequence allows producer gas in the engine intake system to be purged from the engine and exhaust. The provision of the delay timer 434 also means that "nuisance" shutdowns are avoided, at least in some circumstances. For example, the response to momentary overspeed (sensor 254) is immediate gas shut-off (snap-off valve actuator 266) but if the overspeed is not maintained longer than the delay time (delay timer 434), the diesel fuel will not be cut off and the engine will continue to run on diesel fuel only. A similar result is obtained with manual kill switch 250.

The moderate overspeed sensor 254 is used to signal a moderate overspeeding of the engine which may be caused, for example, by an excess of producer gas or a malfunction of the engine governor and results in the shutdown sequence with delay described above. However, in the event of a dangerous overspeed condition which may result from a sudden, complete or nearly complete unloading of the engine for any reason or, again, from governor malfunction, the engine safety control circuit operates to immediately actuate all engine shutdown means including tripping of the snap-off gas valve 74, retraction of the diesel fuel stop 206, tripping of the diesel fuel rack puller 220 and in addition closing of the butterfly valve 66 on the engine air intake stack 64 so as to starve the engine of air. Manual actuation of the emergency off switch 252 results in the same mode of shutdown as extreme engine overspeeding a mode in which both fuels feeding the engine are shut off simultaneously. In a typical application, engine speeds might be as follows: normal operating 1800 rpm, moderate overspeed 2100 rpm, and dangerous overspeed 2800 rpm.

The manual kill switch 250 should normally be used for shutting down the engine and the emergency off switch 252 reserved for true emergencies as damage to the engine may result from the shutdown mode in which the engine is starved of air.

The starting up and operation of the portable self-contained electrical generating system will now be described with particular reference to operating procedures and features of a producer gas system, dual-fueled engine and a combination of the two as exemplified by the described embodiment. For clarity and brevity, certain assumptions will be made and much obvious and conventional detail will be omitted.

It is assumed that the fuel storage bin 16 has been filled with a suitable fuel stock such as crop residue, (for example, corn cobs), that the engine 28 is connected to a diesel fuel supply (not shown) also on the trailer 10 and that conventional electrical power transmission means are provided as required in addition to those indicated in the control circuit diagrams of FIGS. 4, 5 and 9. Power from the alternator 30 is used as appropriate, for example, to power motors (not shown) driving, for example, the solid fuel conveyor system 32, the blower 26 and the gasifier rotatable grate 122. A conventional DC power unit as described above is available for various control functions.

Figure 10:
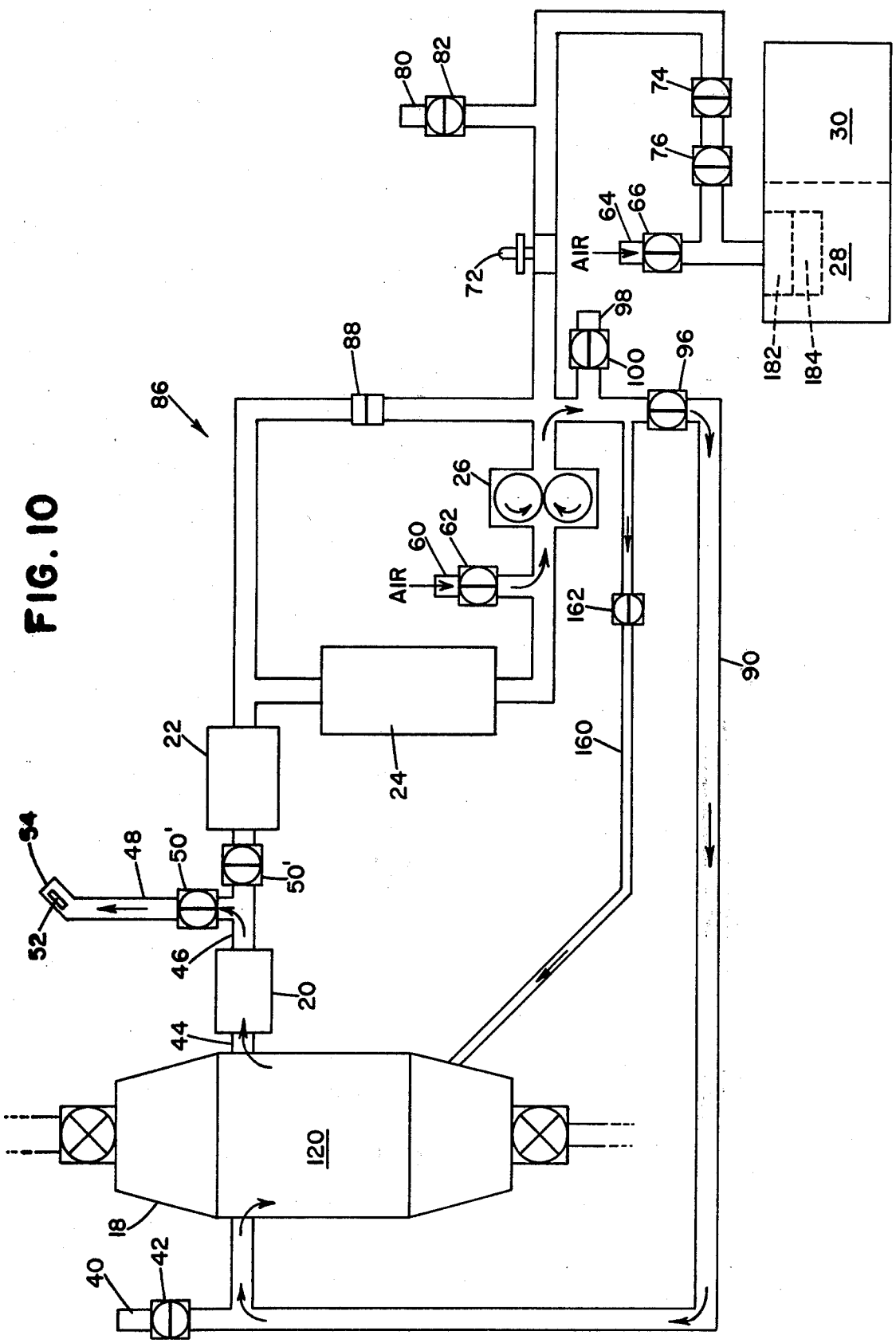
FIG. 10 is a simplified air and gas flow circuit diagram showing valve settings and flow patterns when the gasifier is first fired up.

The condition of the system at start-up is indicated generally and diagrammatically in FIG. 10. It will be understood that certain routine checks, setting of controls, etc. should be made in addition to those described but these will be obvious to one skilled in the art. The pyrolysis of producer gas generation and typical compositions of gas produced are well known and not discussed here.

The tee handle 222 of the fuel rack puller 220 is pulled to prepare or reset the fuel rack 204 for normal operation and the diesel engine throttle is set for idle and the engine started (the fuel rack stop 206 is now effective to establish a minimum diesel fuel injection rate).

The gasifier air inlet or check valve 42 and the cool gas flare valve 82 are closed and the starting air stack valve 62, the muffler or bleed pipe adjustable throttle valve 100, the blower-to-gasifier inlet valve 96 and the ash sensor cooling pipe valve 162 are opened. The three-way valve 50 is set to conduct gas from the precleaned gas pipe 46 to the raw gas flare pipe 48 and the snap-off and gas throttle valves 74, 76 respectively at the engine are also closed. For simplicity, in FIG. 10 (and in FIG. 11) three-way valve 50 is shown as two simple shut-off valves 50' placed so as to reproduce the function of the three-way valve 50.

Speed of the engine 28 is then set so that output from the alternator 30 is at the required frequency (typically 60 cycles per second) and the blower 26 is switched on and the ignition control 52 of the raw gas flare stack 48 is set for automatic ignition. Controls of the solid fuel and ash conveyors 32 and 34 respectively are set for automatic operation and check is made to see that the gasifier 18 is full of fuel.

Next, fuel stock in the firebox 120 of the gasifier 18 may be ignited by any convenient method and with the blower 26 switched off. After igniting the fuel stock, the blower 26 is switched on again and it will be clear that with the valve settings indicated in FIG. 10 and described above the blower 26 will draw air into the starting-air stack 60 and circulate it (as indicated by arrows in FIG. 10) under pressure through the blower-to-gasifier inlet pipe 90, thence (as indicated in FIG. 2) to pass downwards and then upwards in the air plenum 134 of the gasifier 18 to be forced radially into a packed-bed of fuel through the tuyeres 124. The flow is maintained downwards through the fuel bed in the firebox 120 and by pyrolysis gas which is produced. Gas passes through the grate 122 and into and upwards through the off-gas plenum 136 to leave the gasifier 18 through the gasifier-to-cyclone pipe 44, through the cyclone 20 and hence to the raw gas flare stack 48 by way of the precleaned gas pipe 46. In this condition, air will be bled also from the muffler valve pipe 98 but components are sized so that a small positive pressure will be developed in the firebox 120 to accelerate the development of the desired combustion condition. If initial air flow is too high, the fire in the firebox 120 may be extinguished. Gas production will begin and gas will flow in the system and upon reaching the raw gas flare pipe outlet 54 will be ignited automatically. The muffler pipe adjustable throttle valve 100 should be adjusted to control the combustion rate by increasing or decreasing the amount of air bled off from the blower 26 delivery as indicated by the condition of the flare flame at flare outlet 54. Positive (above atmospheric) pressure in the gasifier accelerates bringing the combustion reaction up to temperature and makes possible checking the produced gas early, close to the gasifier, at flare pipe 48. When temperature of the off gas leaving the gasifier 18 reaches a predetermined appropriate operating level, the blower 26 is switched off.

Now that the gasifier 18 has been fired up and producer gas is available for delivery to the engine, preparations are made, as indicated in FIG. 11, for dual-fuel operation by shutting off the blower 26 and opening the gasifier air inlet valve 42, by switching the three-way valve 50 (50' in FIG. 11) to a position so that gas will flow from the precleaned gas pipe 46 to the filter 22 and opening and the cool gas or engine flare pipe valve 82 (for "proving" gas only—not for running) and closing the starting air stack valve 62, the muffler pipe valve 100 and the blower-to-gasifier inlet pipe valve 96 adjacent the engine 28; the snap-off valve 74 is cocked open and a check is made that the gas throttle valve 76 is closed. The blower is then again switched on and producer gas will be drawn through the system and delivered to the cool gas flare 80 where it is ignited for proving the quality of the gas preparatory to delivering gas to the engine 28. The flare having proven that the gas is of sufficient quantity and quality for dual-fuel operation, the engine flare valve 82 is closed and the engine control system is switched to an automatic dual-fueled operating mode and, according to the load on the engine, the response of the diesel fuel injection system (pump and governor 200) and the control of the gas throttle valve 76 will be as described above. In normal running then, the condition of the system will be as indicated in FIG. 11 with arrows indicating the flow of air and gas through the system and the pyrolysis is sustained by the flow of air induced through the air inlet pipe 40 and the tuyeres 124, the pressure in the gasifier 18 being somewhat less than atmospheric.

The provision of the upper and lower fuel level sensors, 144 and 146 respectively in the fuel hopper portion 118 of the gasifier 18, along with the ash level sensor 150 in the bottom portion 116 of the gasifier (FIG. 2) and the use of electrically driven conveyors in the fuel conveyor system 32 and in the ash conveyor 34 make the flow of solids through the gasifier readily adaptable to automatic operation. When the level of fuel in the hopper portion 118 falls below the level of the lower sensor 146, gate valve 142 and rotary air lock valve 140 at the top of the gasifier are automatically actuated to admit additional fuel to the hopper until fuel level again reaches the level of the upper sensor 144. Similarly, the rotary air lock valve 148 at the bottom of the gasifier 18 and the ash conveyor 34 are automatically energized to periodically remove ash from the gasifier bottom portion 116. The inverted cone shape of the fuel hopper portion 118 discourages bridging of fuel stock as it passes downwards. The choke plate 123 supports part of the weight of the fuel stock and helps control its downward movement.

The rotary eccentric grate 122 is driven by a variable speed electric motor (not shown) and speed of the grate is adjusted to suit operating conditions. Assuming the size of the gasifier 18 is properly matched to the demands of the engine 28, and the blower 26 is sized accordingly, rate of gas production will automatically follow engine consumption, the blower recirculating gas through the recirculation loop 86 (when pressure downstream of the blower 26 increases sufficiently to open the non-return in-line relief valve 88) and/or drawing in replacement air for combustion through the air inlet 40. In one mode of operation, the speed of the variable speed grate 122 is set fast enough to obtain a throughput of fuel stock at least great enough to satisfy the engine gas demand. Operation could be made fully automatic and more fuel efficient by sensing an ash parameter indicative of completeness of the pyrolysis process and controlling speed of the rotatable grate 122 accordingly.

Coolant from the engine 28 for cooling the grate bearing portion is circulated through the grate cooling assembly or heat exchanger 152 through the pipes 154 and 156 (FIG. 2) and, with the ash sensor cooling pipe valve 162 open, cool gas is bled from the cool gas flow downstream of the blower 26 and piped to the ash sensor heat exchanger 164. After passing through the heat exchanger, this cooling gas is ducted back into the gasifier gas plenum 136 and thence recirculated.

After passing through the cyclone separator 20 and the filter 22 for staged removal of coarse and finer particulate matter respectively, the gas is drawn into the cooler-condenser 24. The use of a comparatively oversized cyclone permits relatively high air flow into the gasifier while still achieving an acceptable level of particulate removal and so helps make possible a more compact unit for a given gas production rate. In the cooler-condenser, the gas passes downwards in parallel flow through a plurality of finned tubes of sufficiently large inside diameter that tars present in the gas at this stage may condense out on the inside walls of the tube and flow downwards into a collecting tank portion 178 while still leaving room for passage of gas through the tubes. The cyclone 20 and filter 22 are preferably insulated to postpone tar condensation until the cooler-condenser 24 is reached. A valve 180 is provided at the base of the collecting tank for occasional dumping of collected material. A suitable fan or blower (not shown) is provided to improve the heat exchanging efficiency of the cooler-condenser. Solid refuse including ash, cyclone dust and filter dust and condensate (tar principally) may be removed periodically from the "collectors" 116, 170, 174 and 178 without interrupting producer gas flow as each collector is effectively "airlocked" as described above.

Passage of the gas through the cyclone 20, the filter 22 and finally the cooler-condenser 24 cleans it so that it may be used in a compression ignition engine without adverse effects from contaminants or wear-causing particulate matter and also cools it to reduce it to such temperature that a reasonable volumetric efficiency of the engine is achieved with regard to the producer gas fuelling. Given sufficient supply from the gasifier 18, the pressure regulator 72 maintains a constant pressure gas supply to the intake manifold of the engine 28.

In normal operation, gas flow from the gasifier 18 will be such that there is a pressure buildup in the gas delivery pipe 68 upstream of the pressure regulator 72 and, especially if the blower 26 is of the positive displacement type, it is convenient to allow for recirculation of gas in the manner indicated in FIG. 11, the in-line relief valve 88 opening as required to allow the recirculation to take place around the cooler-condenser loop 86 of the system.

The provision of a turbo-charger 182 and inter-cooler 184 (as in the present embodiment) in the air intake system of a diesel engine result in well known improvements in engine performance. Here the results are similar except that the turbo-charger 182 and inter-cooler 184 are compressing and cooling a mixture of both combustion air and producer gas and the turbo-charger 182 and inter-cooler 184 in effect further condition the producer gas already cleaned and cooled in the components upstream, helping to make possible a compact, self-contained power unit of relatively high power density, and good diesel engine performance at producer gas to diesel fuel energy ratios of up to the order of 4.5 to 1. Such performance has been obtained with a 6 cylinder, 4 stroke, direct injection diesel engine with 531 cubic inch displacement, a compression ratio of 14.5 to 1 and a power rating of 172 bhp continuous at 1800 rpm. The engine was equipped with a Bosch in-line injection pump and Bosch variable speed governor (type RSV) and drove a 100 kw 12 wire alternator.

I claim:

1. In an internal combustion engine for driving a variable load and adapted for operation on first and second fuels, wherein a predetermined minimum flow of the first fuel is necessary to maintain combustion, means for adjustably controlling the flow of the two fuels comprising:

first means including a first variable position member for controlling the flow of the first fuel to the engine;

means sensing the position of the first member for providing a first electrical signal representative of the first fuel flow to the engine;

means operatively connected to the first member and responsive to engine speed to vary the position of the member and control the speed;

a variable position valve member for controlling the flow of the second fuel to the engine;

means providing a second electrical signal representative of the flow of the second fuel;

means for providing a third electrical signal indicative of the load driven by the engine; and means for comparing the first and second electrical signals with the third electrical signal and varying the position of the valve member to increase the flow of the second fuel responsive to increases in the flow of the first fuel and in the load.

2. The invention defined in claim 1 wherein the means for controlling the flow of the first fuel includes means for establishing a limit position of the first variable member corresponding to the predetermined minimum flow of the first fuel and the varying of the position of the valve member to increase the flow of the second fuel is effective to urge the variable member towards the limit position to maximize the flow of the second fuel.

3. In a power unit including a compression ignition engine having an output shaft subjectible to a variable load, the engine being adapted to operate on a mixture of fuels including first and second fuels and being connected to respective sources of said fuels, a control system for automatically controlling the relative rates of flow of the two fuels responsive to a change in loading of the output shaft comprising:

a variable valve means interposed between the source of the first fuel and the engine for controlling the rate of flow of the first fuel;

a valve transducer operatively associated with the valve means having an output representative of the rate of flow of the first fuel;

a variable injection means interposed between the source of the second fuel and the engine, for controlling the rate of flow of the second fuel;

an injection means transducer operatively associated with the injection means having an output representative of the rate of flow of the second fuel;

an engine speed governor operatively connected to the injection means for automatically controlling engine speed at a preselected approximately constant level, the governor operating to cause an increase or decrease of rate of flow of the second fuel in response to decrease or increase respectively in engine speed, said changes in engine speed corresponding to increase and decrease in output shaft loading respectively;

means for electronically comparing the output of the valve transducer with that of the injection means transducer, and generating an error signal representative of the difference in the respective rates of flow of the first and second fuels; and power means for receiving the error signal and adjusting the valve means in response to that signal so that the rate of flow of the first fuel is changed tending to change engine speed and the injection means, responsive to the governor, correspondingly and inversely changes the rate of flow of the second fuel so as to maintain engine speed at the preselected level and establish a ratio of rates of flow of the first fuel to the second fuel at a predetermined level according to output shaft loadings.

4. The invention defined in claim 3 wherein the injection means includes a means for establishing a predetermined minimum rate of flow of the second fuel and the power means is operable to adjust the valve means so that the rate of flow of the second fuel is reduced to said minimum.

5. In the combination of an internal combustion engine having a cylinder with first and second inlets connected respectively to sources of first and second fuels so that the cylinder may be supplied with a mixture of said first and second fuels and an output shaft subject to variable loading, said first inlet having speed-governed means for controlling the flow of the first fuel interposed between the fuel source and the first inlet and including a movable control element, the position of said element varying with output shaft loading, and an adjustable power operated valve interposed between the second fuel source and the second inlet for controlling the flow of the second fuel, the method of electronically controlling the fuel flow comprising the steps of:

measuring the loading of the output shaft and transducing said measurement to a load signal;

sensing the position of the control element and transducing said position to a control element signal;

sensing the power operated valve setting and transducing said setting to a valve signal;

electronically combining the load and control element signals and comparing the combination with the valve signal to generate an error signal; and transducing the error signal to a power signal for repositioning the valve so as to vary the flow of the second fuel relative to the first in response to changes in output shaft loading.

* * * * *